(12) United States Patent
Shrivastava et al.

(10) Patent No.: US 12,615,594 B2
(45) Date of Patent: Apr. 28, 2026

(54) METHODS AND APPARATUSES FOR HANDLING DRX OPERATION IN A WIRELESS NETWORK

(71) Applicant: Samsung Electronics Co., Ltd., Suwon-si (KR)

(72) Inventors: Vinay Kumar Shrivastava, Bangalore (IN); Jajohn Mathew Mattam, Bangalore (IN); Aby Kanneath Abraham, Bangalore (IN); Sriganesh Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 18/181,211

(22) Filed: Mar. 9, 2023

(65) Prior Publication Data

US 2023/0300749 A1    Sep. 21, 2023

(30) Foreign Application Priority Data

Mar. 17, 2022    (IN) .............................. 202241014701
Feb. 23, 2023    (IN) ............................ 2022 41014701

(51) Int. Cl.
*H04W 52/02*    (2009.01)
*H04L 1/1812*    (2023.01)

(52) U.S. Cl.
CPC ....... *H04W 52/0232* (2013.01); *H04L 1/1812* (2013.01); *H04W 52/0277* (2013.01)

(58) Field of Classification Search
CPC .......... H04W 52/0232; H04W 52/0277; H04L 1/1812; H04L 2001/0097; H04L 1/1822; H04L 1/1851; H04L 1/1854
See application file for complete search history.

(56) References Cited

U.S. PATENT DOCUMENTS

| | | | | |
|---|---|---|---|---|
| 12,317,158 B2* | 5/2025 | Zhou | ....................... | H04W 4/06 |
| 2009/0181670 A1* | 7/2009 | Tseng | ................... | H04W 76/28 |
| | | | | 455/434 |
| 2018/0110085 A1 | 4/2018 | Tseng | | |
| 2019/0052413 A1 | 2/2019 | Babaei et al. | | |
| 2020/0313808 A1 | 10/2020 | Lee et al. | | |
| 2021/0029641 A1 | 1/2021 | Khoshnevisan et al. | | |
| 2021/0258105 A1* | 8/2021 | Shrestha | ............... | H04L 1/1887 |

(Continued)

OTHER PUBLICATIONS

Indian Office Action dated Jan. 22, 2024, issued in Indian Application No. 202241014701.

*Primary Examiner* — Hoang-Chuong Q Vu

(74) *Attorney, Agent, or Firm* — Jefferson IP Law, LLP

(57) ABSTRACT

A method for handling a Discontinuous reception (DRX) operation by a user equipment (UE) in a wireless network is provided. The method includes detecting an event. The event includes at least one of a hybrid automatic repeat request (HARQ) feedback being disabled, a HARQ feedback not being configured, or an unsuccessful multicast transport block (TB) decoding. Further, the method includes performing an action based on the detected event. In an example, the action includes adding an additional timing duration to at least one preconfigured DRX timer value and staying awake by the UE while the preconfigured timer is running. The action includes staying awake by the UE in spite of a multicast DRX active time being over and continuing to monitor for potential HARQ retransmission.

16 Claims, 7 Drawing Sheets

(56) References Cited

U.S. PATENT DOCUMENTS

| | | | |
|---|---|---|---|
| 2022/0151015 A1* | 5/2022 | Lu .......................... | H04W 76/28 |
| 2022/0225467 A1* | 7/2022 | Shrestha ............. | H04W 52/028 |
| 2022/0264616 A1* | 8/2022 | Shah ..................... | H04L 1/1854 |
| 2022/0346015 A1* | 10/2022 | Li .......................... | H04L 5/0053 |
| 2023/0062804 A1* | 3/2023 | Selvanesan ........... | H04W 76/28 |
| 2023/0063082 A1* | 3/2023 | Zhou ..................... | H04W 72/30 |
| 2023/0063472 A1* | 3/2023 | Freda ................ | H04W 52/0229 |
| 2023/0127560 A1* | 4/2023 | Li .......................... | H04W 76/28 |
| | | | 370/329 |
| 2023/0164768 A1* | 5/2023 | Park ..................... | H04L 1/1896 |
| | | | 370/329 |
| 2023/0247550 A1* | 8/2023 | Yu .......................... | H04W 76/28 |
| | | | 370/311 |
| 2023/0403681 A1* | 12/2023 | Wen .................. | H04W 52/0216 |
| 2024/0057122 A1* | 2/2024 | Lee ..................... | H04W 72/1263 |
| 2024/0163962 A1* | 5/2024 | Freda ................... | H04W 76/23 |
| 2024/0365346 A1* | 10/2024 | Hong ................... | H04L 1/1812 |
| 2025/0024492 A1* | 1/2025 | Kazmi ............... | H04W 68/005 |
| 2025/0071633 A1* | 2/2025 | Tseng ................... | H04L 1/1822 |

* cited by examiner

METHODS AND APPARATUSES FOR HANDLING DRX OPERATION IN A WIRELESS NETWORK

CROSS-REFERENCE TO RELATED APPLICATION(S)

This application is based on and claims priority under 35 U.S.C. § 119(a) of an Indian Provisional patent application number 202241014701, filed on Mar. 17, 2022, in the Indian Patent Office, and of an Indian Complete patent application number 202241014701, filed on Feb. 23, 2023, in the Indian Patent Office, the disclosure of each of which is incorporated by reference herein in its entirety.

BACKGROUND

1. Field

The disclosure relates to wireless communication networks (or wireless networks). More particularly, the disclosure relates to methods and apparatuses for handling Discontinuous reception (DRX) operations for receiving New Radio (NR) Multicast Broadcast Service (MBS).

2. Description of Related Art

In wireless communication networks, a New Radio Multicast Broadcast Service (NR MBS) can refer to multicast services where intended common contents are targeted to a group of User Equipments (UEs) which have joined a multicast group in a multicast coverage area. The broadcast services comprise contents targeted to all the UEs in a broadcast coverage area. The multicast coverage area or the broadcast coverage area may be one cell or larger cells.

Two delivery methods are utilized by the UE for receiving the multicast services from the wireless network (e.g., a gNodeB (gNB)). The gNB delivers MBS data to the UEs using either a Point-to-Point (PTP) delivery or a Point-to-Multipoint (PTM) delivery. The PTP delivery is data transmission to a single target UE in the MBS. The PTM delivery is data transmission to multiple target UEs in the MBS. Further, at the UE, a multicast bearer may comprise a common Protocol Data Convergence Protocol (PDCP) entity with the PTP, the PTM or a combination of PTP and PTM legs or Radio link control (RLC) entities (also termed as MBS split bearer).

In the wireless communication networks, unicast is a traditional data transmission from a single source to a single target. For the purpose of power saving and efficient scheduling, a unicast reception is associated with a unicast Discontinuous Reception (DRX) approach. Further, there is a need for the DRX approach for reception of MBS services on PTM and PTP paths. A session specific DRX configuration is needed for power-effectively receiving multicast service reception. Unlike a long-term evolution evolved multimedia broadcast and multicast services (LTE eMBMS) (which supported primarily broadcast services), a NR MBS is also targeted to support higher reliability multicast services for which mechanism for increased reliability, e.g., Hybrid Automatic Repeat Request (HARQ) feedback and retransmissions are needed to ensure recovery of packet loss over a channel. Further, the HARQ feedback may be enabled or disabled by the gNB dynamically depending on channel conditions or service kinds and so on.

If at least one of the HARQ feedback is disabled or the HARQ feedback is not configured for the UE, the gNB can still possibly retransmit the data for other UEs or perform blind retransmission(s), especially for a cell-edge or a poor coverage UE. A potential issue here may be that the UE for which at least one of the HARQ feedback is disabled or the HARQ feedback is not configured, will not start a drx-HARQ-Round Trip Time (RTT)-TimerDL-PTM timer and therefore, the drx-RetransmissionTimerDL-PTM timer will also not be operated for the UE. Consequently, the Multicast DRX's Active Time may lapse early, and the UE may go to a sleep mode, in spite of not decoding the multicast transport block successfully and the UE suffers packet loss. This has been illustrated in FIG. 1.

FIG. 1 illustrating a third-generation partnership project (3GPP) procedure (100) for HARQ feedback and HARQ retransmissions, according to the related art. At operation 102, a UE (200) is receiving the multicast. At operation 104, the method includes determining whether the UE (200) (explained in FIG. 2) is configured with harqFeedbackEnablerMulticast. In response to determining that the UE (200) is configured with the harqFeedbackEnablerMulticast then, at operation 106, the method includes determining whether the harq-FeedbackEnablerMulticast is set to enabled or harq-FeedbackEnablerMulticast is set to downlink control information (dci)-enabler and HARQ feedback is indicated as enabled by the DCI (e.g. the DCI 4_2 may include a field to indicate whether HARQ feedback is enabled or disabled. While DCI 4_1 when scheduled implies that HARQ feedback is enabled).

In response to determining that the UE (200) is not configured with the harqFeedbackEnablerMulticast or the harq-FeedbackEnablerMulticast is not set to enabled or harq-FeedbackEnablerMulticast is not set to dci-enabler and/or the HARQ feedback is not indicated as enabled by the DCI (i.e. it is disabled) then, at operation 108, the UE (200) provides no HARQ feedback and the UE (200) does not start RTT and retransmission (ReTx) timer. At operation 110, the UE (200) goes to the sleep mode when an on-Duration timer and an inactivity timer expires in spite of multicast transport block (TB) not decoded successfully.

In response to determining that the harq-FeedbackEnablerMulticast is set to enabled or harq-FeedbackEnablerMulticast is set to dci-enabler and the HARQ feedback is indicated as enabled by the DCI then, at operation 112, the UE (200) provides the HARQ feedback and the UE (200) starts RTT after HARQ feedback transmission and ReTx timer upon RTT timer expiry with multicast TB decode not successful.

At operation 114, the UE (200) stays awake when at least one of on-Duration timer, an inactivity timer and ReTx timer is running and receives retransmission for the multicast TB not decoded successfully.

The issue as noticed at operation 110 wherein UE is not able to receive multicast TB successfully and still it goes to sleep is not addressed by 3GPP specification (i.e., Release 17 MBS specifications) and needs a solution to be performed by the UE implementation and/or network implementation to resolve the aforementioned issue and associated drawbacks.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and a wireless network for handling a DRX operation for a UE receiving New Radio Multicast Broadcast Service (NR MBS).

An aspect of the disclosure is to provide methods and the wireless network for handling DRX operation for the UE receiving the NR MBS, which supports power efficient and reliable delivery of the fifth generation (5G) MBS services, wherein MBS multicast uses session specific DRX configuration for the power saving. The UE stays awake and prevent or recovers the potential loss of multicast packet when the HARQ feedback is not configured and/or not enabled and there is a successful decoding of multicast packet or Transport block (TB).

An aspect of the disclosure is to provide methods and the wireless network for handling the DRX operation for the UE receiving the NR MBS, in which Radio Resource Control (RRC) layer controls multicast DRX operation for a PTM per Group-Radio Network Temporary Identifier (G-RNTI) or per Group-Configured Scheduling—Radio Network Temporary Identifier (G-CS-RNTI) by configuring a plurality of parameters and HARQ feedback configuration.

Additional aspects will be set forth in part in the description which follows and, in part, will be apparent from the description, or may be learned by practice of the presented embodiments.

In accordance with an aspect of the disclosure, methods for handling a discontinuous reception (DRX) operation by a user equipment (UE) in a wireless network are provided. The method includes detecting an event comprising at least one of a hybrid automatic repeat request (HARQ) feedback being disabled, a HARQ feedback not being configured, or an unsuccessful multicast transport block (TB) decoding, and performing at least one action based on the detected event.

In an embodiment, the at least one action may include configuring and running at least one local timer to track at least one of a HARQ Round Trip Time (RTT) or a HARQ Retransmission (ReTx) and staying awake by the UE while the at least one local timer is running.

In an embodiment, the at least one action may include adding an additional timing duration to at least one preconfigured DRX timer value and staying awake by the UE while the at least one preconfigured timer is running.

In an embodiment, the at least one action may include staying awake by the UE in spite of a multicast DRX active time being over and continuing to monitor for potential HARQ retransmission.

In an embodiment, the at least one action may include moving the UE to a sleep mode after clearing a HARQ buffer in which the UE expects a next transmission to be a new transmission and considering new data indictor (NDI) bit as toggled regardless of an actual value of NDI bit.

In an embodiment, the at least one action may include staying awake and waiting for the HARQ retransmissions upon determining a battery level of the UE meets a predefined threshold battery level.

In an embodiment, the at least one action may include performing one of staying awake or moving the UE to a sleep mode based on a service information provided by an application layer associated with the UE or a service layer associated with the UE.

In an embodiment, the at least one local timer may be configured per downlink (DL) HARQ process associated to a multicast service.

In an embodiment, a value of the at least one local timer may be at least one of: at least one of a configured value for a RTT timer or a configured value for a ReTx timer before a HARQ feedback is disabled, a timer value received during a radio resource control (RRC) configuration, a one or more HARQ retransmissions duration time, or a maximum value defined for a RTT time or a maximum value defined for a ReTx time.

In an embodiment, the DRX operation may be handled, when the UE receives a new radio multicast broadcast service (NR MBS).

In an embodiment, when the detected event comprises at least one of the HARQ feedback being disabled or the HARQ feedback not being configured, the method further includes determining that a multicast TB decoding is not successful and performing at least one of starting a local timer associated with a HARQ process and continue monitoring a physical downlink control channel (PDCCH) for at least one retransmission upon determining that the multicast TB decoding was not successful and stopping the local timer associated with the HARQ process upon determining that the local timer is running, and the multicast TB decoding is successful.

In an embodiment, when the detected event comprises at least one of the HARQ feedback being disabled or the HARQ feedback not being configured, the method further includes determining, by the UE, whether a downlink (DL) data is received with same new data indictor (NDI) as compared to previous transmission in the HARQ process in response to continue monitoring the PDCCH for the at least one retransmission. In an embodiment, the method includes stopping the local timer associated with the HARQ process upon determining that the DL data has been received with different NDI as compared to a previous transmission in the HARQ process. In another embodiment, the method includes determining whether the multicast TB decoding is successful upon determining that the DL data has been received with same NDI as compared to a previous transmission in the HARQ process and stopping the local timer when the multicast TB decoding is determined to be successful or continuing the local timer when the multicast TB decoding is determined to be not successful. In another embodiment, the method includes determining whether the local timer has expired upon determining that the DL data has not been received and moving the UE to a sleep mode when the local timer is determined to be expired.

In an embodiment, when the detected event comprises at least one of the HARQ feedback being disabled or the HARQ feedback not being configured, the method further includes identifying at least one metric value and a threshold value that is identified based on at least one of a measured signal information, a decoding performance information, or a channel quality information, wherein at least one the metric value and the threshold value can be at least one of predefined, configured or implementation determined. Further, the method includes determining the at least one metric value meets a threshold value. In an embodiment, the method includes staying awake waiting for a HARQ retransmission when multicast TB is not successfully decoded, even when multicast DRX Active Time is elapsed upon determining that the at least one metric value meets the threshold value. In an embodiment, the method may include moving to a sleep mode when multicast active time elapses in spite of a multicast TB is not successfully decoded upon determining that the at least one metric value does not meet the threshold value.

In accordance with an aspect of the disclosure, methods for handling a DRX operation in a wireless network are provided. The method includes detecting, by a network entity, an event. The event includes at least one of a HARQ feedback being disabled, the HARQ feedback not being configured, or a multicast TB decoding not being successful. Further, the method includes sending, by the network entity, a message to a UE. The message includes a modified configuration associated with a DRX timer, on detecting the event.

In an embodiment, the event may be detected based on at least one parameter. The at least one parameter comprises at least one of a measurement reporting information, a measured block error rate information, a State Information (CSI) feedback information, a Sounding Reference Signal (SRS) transmission information, a service QoS constraint information, or a Quality of experience (QoE) reporting and location information.

In accordance with an aspect of the disclosure, methods for handling a DRX operation in a wireless network are provided. The method includes receiving, by a network entity, a message from a network device based on an input received from the network device. The message indicates whether an MBS HARQ retransmission is needed for all the UEs or for a sub-set of the UEs or an individual UE. Further, the method includes handling, by the network entity, the DRX operation based on the received message where handling the DRX operation includes at least one of: configuring a UE for a waiting time for an MBS HARQ retransmission or configuring the UE for sending a HARQ feedback.

In an embodiment, the network entity includes a gNB wherein the network device comprises at least one of a Network Exposure Function (NEF) entity, an Access and Mobility Management Function (AMF), a User Plane Function (UPF) entity, a Multicast Broadcast Single Frequency Network (MBSFN), a gNB, or a Multicast Broadcast Session Management Function (MB-SMF). The input includes at least one of an experienced packet error rate or an expected service quality.

In accordance with an aspect of the disclosure, a UE for handling a discontinuous reception (DRX) operation in a wireless network is provided. The UE includes a memory and at least one processor coupled to the memory. The at least one processor is configured to detect an event comprising at least one of a HARQ feedback being disabled, the HARQ feedback not being configured, or an unsuccessful multicast TB decoding and perform at least one action based on the detected event.

In accordance with an aspect of the disclosure, when the detected event comprises at least one of the HARQ feedback being disabled or the HARQ feedback not being configured, the at least one processor is further configured to determine that a multicast TB decoding is not successful. In an embodiment, the at least one processor may be configured to start a local timer associated with a HARQ process and continue monitor a PDCCH for at least one HARQ retransmission upon determining that the multicast TB decoding was not successful. In an embodiment, the at least one processor may be configured to stop the local timer associated with the HARQ process upon determining that the local timer is running, and the multicast TB decoding is successful.

In an embodiment, the at least one processor may be configured to determine whether a DL data received with same NDI as compared to previous transmission in the HARQ process in response to continue monitoring the PDCCH for the at least one retransmission. In an embodiment, the at least one processor may be configured to stop the local timer associated with the HARQ process upon determining that the DL data has been received with different NDI as compared to a previous transmission in the HARQ process. In an embodiment, the at least one processor may be configured to determine whether the multicast TB decoding is successful upon determining that the DL data has been received with same NDI as compared to a previous transmission in the HARQ process and stopping the local timer when the multicast TB decoding is determined to be successful or continuing the local timer when the multicast TB decoding is determined to be not successful. In an embodiment, the at least one processor may be configured to determine whether the local timer has expired upon determining that the DL data has not been received and moving the UE to a sleep mode when the local timer is determined to be expired.

In accordance with an aspect of the disclosure, when the detected event comprises at least one of the HARQ feedback being disabled or the HARQ feedback not being configured, the at least one processor is further configured to identify at least one metric value and a threshold value that is identified based on at least one of a measured signal information, a decoding performance information, or a channel quality information, wherein at least one of the metric value and the threshold value can be at least one of predefined, configured or implementation determined. Further, the at least one processor is configured to determine that the at least one metric value meets a threshold value. In an embodiment, the DRX operation controller is configured to stay awake waiting for a HARQ retransmission when multicast TB is not successfully decoded, even when multicast DRX active time is elapsed upon determining that the at least one metric value meets the threshold value. In an embodiment, the at least one processor may be configured to move to a sleep mode when multicast active time elapses in spite of a multicast TB is not successfully decoded upon determining that the at least one metric value does not meet the threshold value.

In accordance with an aspect of the disclosure, a network entity is provided. The network entity includes a memory and at least one processor coupled to the memory. The at least one processor is configured to detect an event, where the event includes at least one of a HARQ feedback being disabled, the HARQ feedback not being configured, or a multicast TB decoding not being successful. The at least one processor is configured to send a message to a UE, where the message includes a modified configuration associated with a DRX timer, on detecting the event.

In accordance with another aspect of the disclosure, a network entity is provided. The network entity includes a memory and at least one processor coupled to the memory. The at least one processor is configured to receive a message from a network device based on an input received from the network device, where the message indicates whether an MBS HARQ retransmission is needed for all the UEs or for a sub-set of UEs or an individual UE. Further, the at least one processor is configured to handle the DRX operation based on the received message wherein handle the DRX operation includes at least one of configure a UE for a waiting time for an MBS HARQ retransmission or configure the UE for sending a HARQ feedback.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
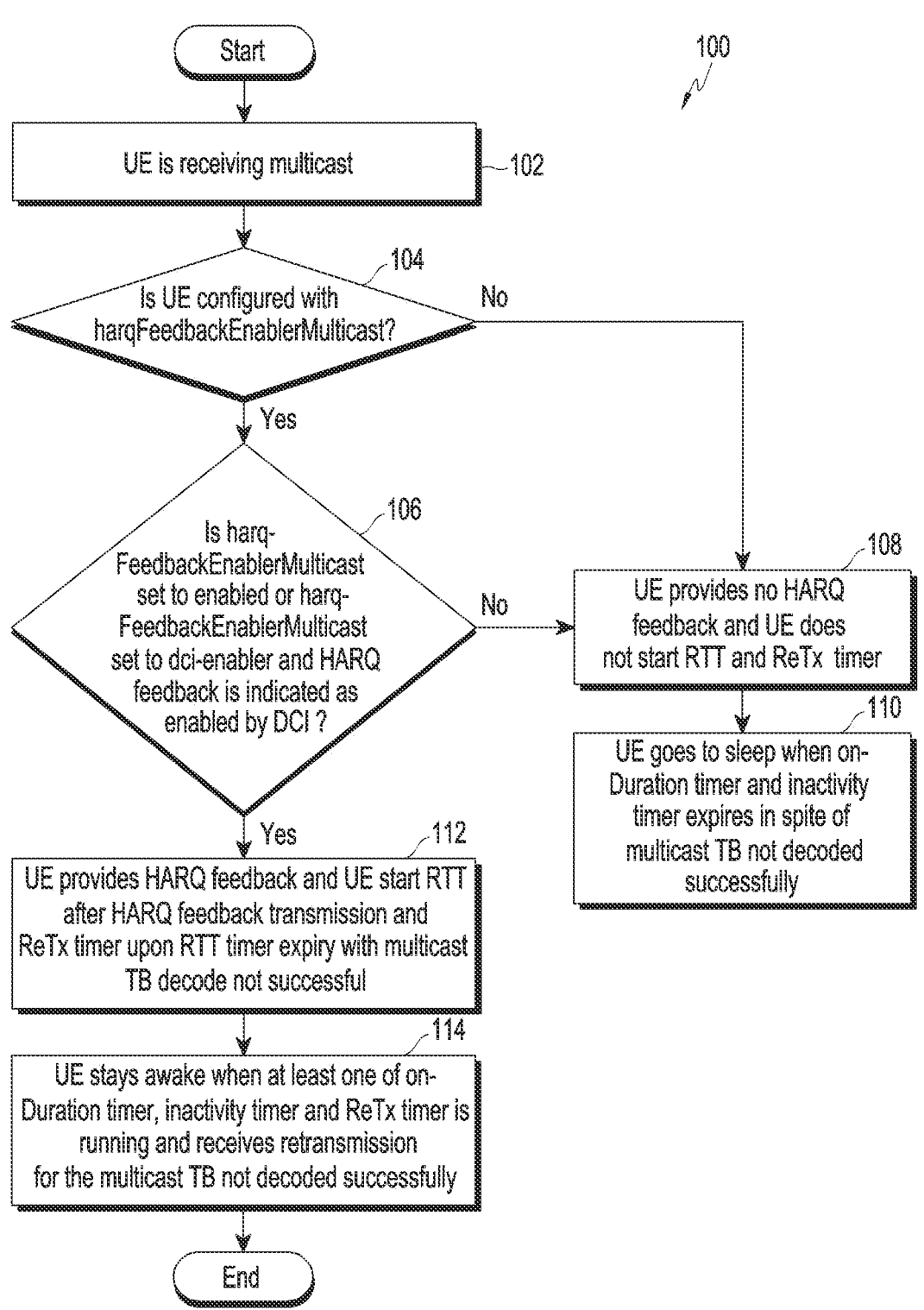
FIG. 1 illustrating 3GPP procedure for HARQ feedback and HARQ retransmissions, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein achieve methods for handling a DRX operation in a wireless network. The method includes detecting, by a UE, an event. The event includes at least one of a HARQ feedback being disabled, a HARQ feedback not being configured, and an unsuccessful multicast TB decoding. Further, the method includes performing, by the UE, at least one action based on the detected event. The method may be used to handle the DRX operation in a power efficient and reliable manner when the UE receives 5G MBS services. In the proposed method, the UE may prevent or recover the loss of MBS multicast packet when the multicast TB decoding is not successful and the HARQ feedback is not configured or not enabled. With no starting of RTT and/or ReTX timer, the UE may normally go to sleep and loose the multicast packet. In the proposed method, the UE stays awake and avail HARQ retransmission and prevent or recover the loss of MBS multicast packet.

Referring now to the drawings, and more particularly to FIGS. 2 through 9, where similar reference characters denote corresponding features consistently throughout the figures, there are shown at least one embodiment.

Figure 2:
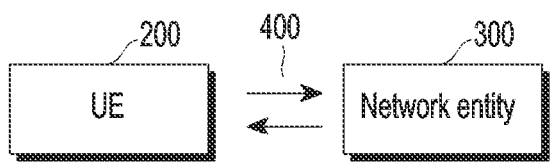
FIG. 2 shows a schematic overview of a wireless network for handling a DRX operation when a UE receives a multicast and broadcast service, according to an embodiment of the disclosure.

FIG. 2 shows a schematic overview of a wireless network (400) for handling a DRX operation when a UE (200) receives a multicast and broadcast service, according to an embodiment of the disclosure. The wireless network (400) may be, for example, a fourth generation wireless network, a fifth generation wireless network, Open Radio Access Network (ORAN) or the like.

Referring to FIG. 2, the wireless network (400) includes the UE (200) and a network entity (300). The UE (200) may be, for example, a laptop, a smart phone, a desktop computer, a notebook, a Device-to-Device (D2D) device, a vehicle to everything (V2X) device, a foldable phone, a smart TV, a tablet, a television, a connected car, an immersive device, and an internet of things (IoT) device. The network entity (300) may be, for example, a gNB, a new radio (NR) base station, a NR transceiver or the like. In the proposed method, a Radio Resource Control (RRC) layer controls multicast DRX operation for PTM per G-RNTI or per Group-Configured Scheduling—Radio Network Temporary Identifier (G-CS-RNTI) by configuring a plurality of parameters. A parameter from the plurality of parameters are defined as follow:

drx-onDurationTimerPTM: The duration at a beginning of a DRX cycle.

drx-SlotOffsetPTM: A delay before starting the drx-on-DurationTimerPTM.

drx-InactivityTimerPTM: The duration after a PDCCH occasion in which a PDCCH indicates a new DL multicast transmission for a Medium Access Control (MAC) entity.

drx-LongCycleStartOffsetPTM: A long DRX cycle and drx-StartOffsetPTM which defines the subframe where the long DRX cycle starts;

drx-RetransmissionTimerDL-PTM (per DL HARQ process for multicast MBS): The maximum duration until a DL multicast retransmission is received. Embodiments herein may also refer to it as ReTx timer.

drx-HARQ-RTT-TimerDL-PTM (per DL HARQ process for multicast MBS): The minimum duration before a DL multicast assignment for HARQ retransmission is expected by the MAC entity. Embodiments herein may also refer to it as RTT timer.

Active Time is the time period during which the MAC entity monitors a set of allocated RNTIs. The time period which is not Active Time is called non-Active Time.

Multicast DRX Active Time is a time period during which the MAC entity monitors a set of allocated group RNTIs, i.e., G-RNTI and G-CS-RNTI on group-common PDCCH. Unicast DRX Active Time is a time period during which the MAC entity monitors a set of UE-specific RNTIs, i.e., C-RNTI and CS-RNTI on UE-specific PDCCH.

In an embodiment, the PTP DRX configuration is same as the unicast DRX configuration. Further, there is also HARQ based retransmission support for reliability. The UE (200) may be configured and provided NACK only HARQ feedback or ACK-NACK based HARQ feedback. In another embodiment, the HARQ feedback can also be enabled or disabled by the UE specific signaling, which can be for reasons such as, Physical Uplink Control Channel (PUCCH) resource limitations. The HARQ feedback enable/disable is supported by Downlink Control Information (DCI) or a RRC reconfiguration message. The RRC reconfiguration message may provide the related configuration as follows:

harq-FeedbackEnablerMulticast: This indicates whether a UE (200) shall provide HARQ-ACK feedback for MBS multicast. Value dci-enabler means that whether the UE (200) shall feedback HARQ-ACK for the MBS multicast is indicated by the DCI (e.g. the DCI 4_2 can include a field to indicate whether HARQ feedback is enabled or disabled. While DCI 4_1 when scheduled implies that HARQ feedback is enabled). The value enabled means the UE (200) shall always feedback the HARQ-ACK for the MBS multicast. When the field is absent, the UE shall not feedback the HARQ-ACK for the multicast (i.e., HARQ feedback is disabled).

Local timer based implementation: In still another embodiment, the UE (200) maintains at least one local timer to track the HARQ Round Trip Time (RTT) and/or HARQ Retransmission(s) (ReTx) for the case when at least one of the HARQ feedback is disabled or the HARQ feedback is not configured and the multicast TB decoding is not successful. The local timer can be configured per downlink (DL) HARQ process associated to the multicast (i.e., addressed to a transmission indicated by a G-RNTI or a G-CS-RNTI or a configured downlink assignment for MBS multicast).

Figure 5:
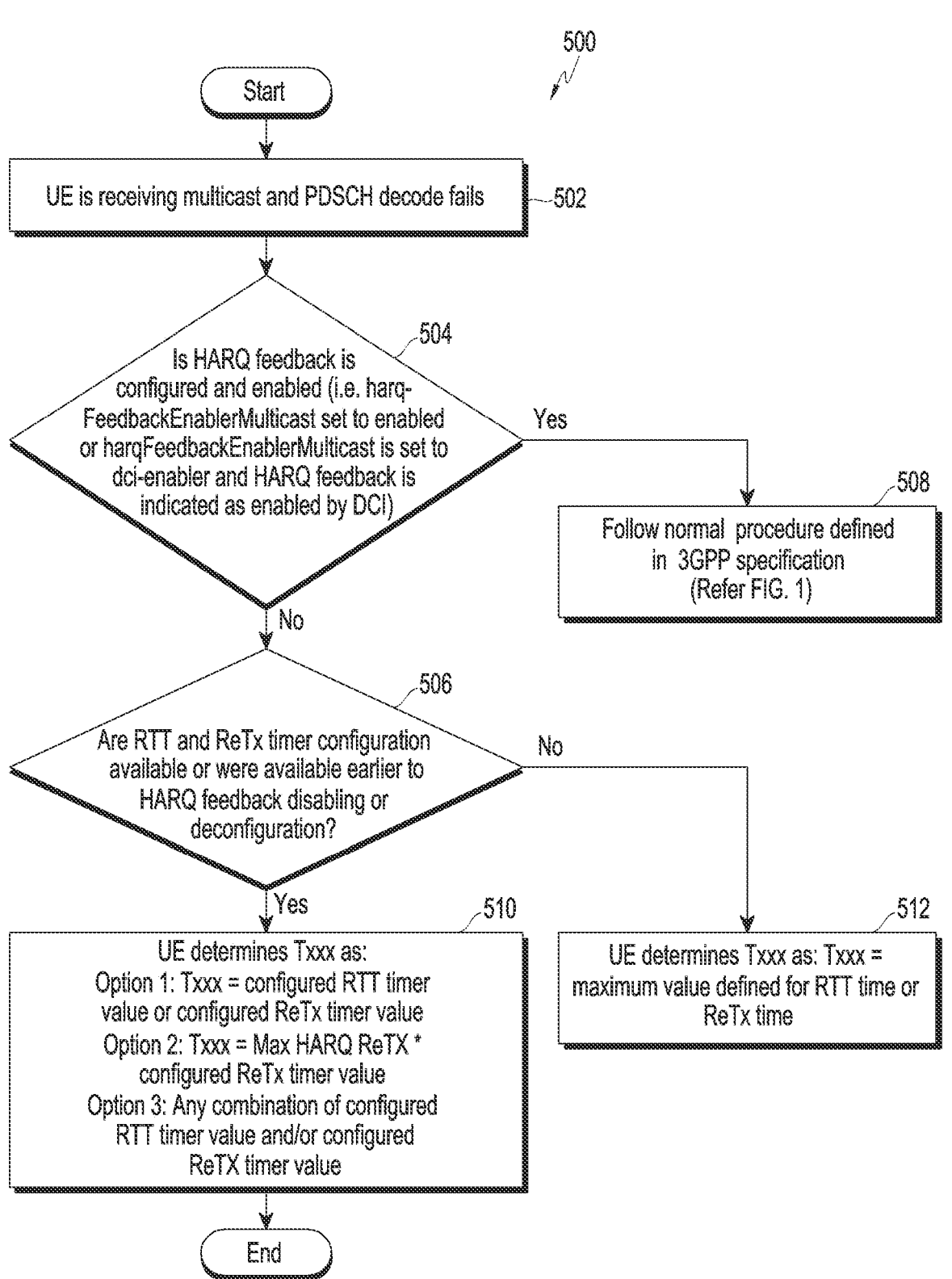
FIG. 5 illustrates an example flow chart of a method for defining local timer Txxx while handling the DRX operation, according to an embodiment of the disclosure.

In yet another embodiment, the UE (200) configures the local timer Txxx in at least one of the following ways (as depicted in FIG. 5):

Timer Txxx is configured to the same value of as at least one of the configured value for RTT time and the configured value for ReTx timer before the HARQ feedback is disabled or if the RRC configurations are available with the UE (200).

In an example, Timer Txxx value is determined by the UE (200) considering the potential one or more HARQ retransmissions duration e.g., Timer Txxx value=Max HARQ ReTx*ReTx timer duration.

In another example, Timer Txxx value is determined by the UE (200) considering the maximum value defined for RTT time or the maximum value defined for ReTx time.

Any combination of configured RTT timer value and/or configured ReTx timer value.

Any UE (200) defined or determined value for Txxx timer.

Figure 6:
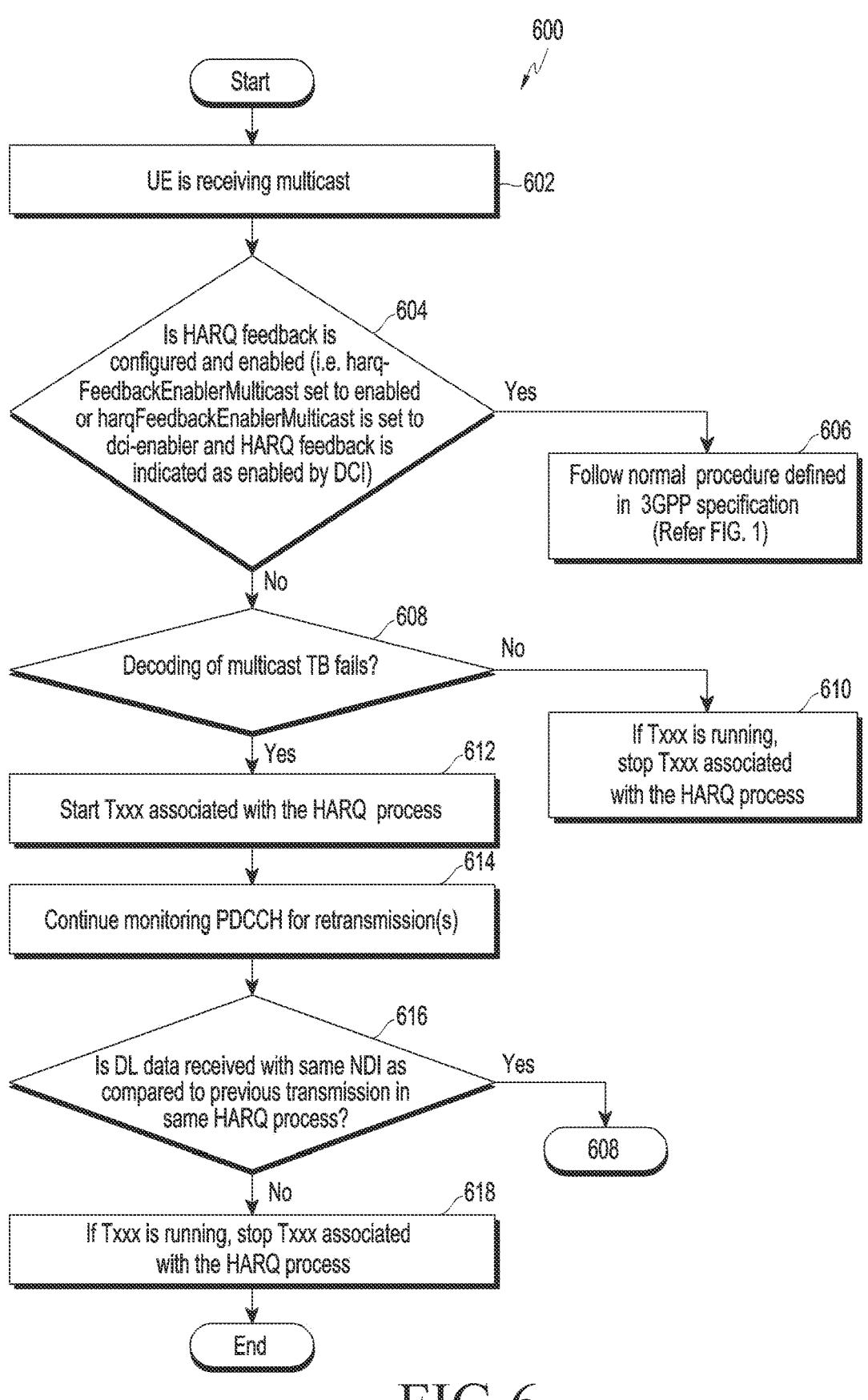
FIG. 6 illustrates an example flow chart of a method for operating local timer Txxx while handling the DRX operation, according to an embodiment of the disclosure.

In one embodiment, referring to FIG. 6, the UE (200) starts the timer Txxx for the associated HARQ process to consider potential blind retransmission(s), or retransmission(s) for other UEs in the case of multicast transport block (TB) decoding failure and continues to stay awake, while the timer Txxx is running. The UE (200) monitors PDCCH addressed to relevant multicast G-RNTI or G-CS-RNTI while being awake. If decoding of the MAC TB fails and UE's HARQ feedback is disabled or the HARQ feedback is not configured, the UE (200) starts the time Txxx for the associated HARQ process.

In an example, if a new transmission is received (i.e., New Data Indictor (NDI) bit in PDCCH is toggled as compared to previous transmission and PDCCH is addressed to the relevant multicast G-RNTI or G-CS-RNTI), the UE (200) stops the timer Txxx for the associated HARQ process.

In another example, if the retransmission is received (i.e., same NDI as compared to previous transmission and PDCCH is addressed to the relevant multicast G-RNTI or G-CS-RNTI), the UE (200) receives and decodes the retransmission. If the decoding of the retransmission is successful, the UE (200) stops the timer Txxx for the associated HARQ process. If the decoding of the retransmission is not successful, the UE (200) may start or restart Txxx for the associated HARQ process. In an alternative embodiment, if the decoding of the retransmission is not successful, the UE (200) may continue Txxx running for the associated HARQ process.

In yet another example, if the timer Txxx expires or is not running (and also other configured DRX timers are not running, e.g., drx-onDurationTimerPTM timer and drx-InactivityTimerPTM timer for the relevant G-RNTI or G-CS-RNTI configuration), the UE (200) goes to the sleep mode, otherwise, the UE (200) continues to be awake.

In another embodiment, the UE (200) appends an additional timing duration to the configured drx-InactivityTimerPTM in the case when at least one of the HARQ feedback is disabled or the HARQ feedback is not configured.

In still another embodiment, the UE (200) appends an additional timing duration to the configured drx-InactivityTimer-PTM in the case, when at least one of the HARQ feedback is disabled or the HARQ feedback is not configured, and the UE (200) is not able to decode the multicast transport block successfully.

In an embodiment of the disclosure, when at least one of the HARQ feedback is disabled or the HARQ feedback is not configured, the UE (200) stays awake in spite of the multicast DRX Active time being over, if the decoding of the received MAC TB is not successful i.e., the HARQ buffer is not empty. The UE (200) continues to monitor for potential HARQ retransmission(s). Once the decoding is successful (i.e., the HARQ buffer becomes empty or the UE (200) fails to decode in spite of maximum retransmissions received), the UE (200) goes to the DRX sleep.

In another embodiment of the disclosure, when at least one of the HARQ feedback is disabled or the HARQ feedback is not configured, and the multicast DRX Active time is over and if the decoding of the received MAC TB is not successful yet (i.e., HARQ buffer is not empty), the UE (200) clears the HARQ buffer. The UE (200) expects the next transmission to be a new transmission and considers an NDI bit as toggled regardless of the actual value of NDI bit.

Figure 7:
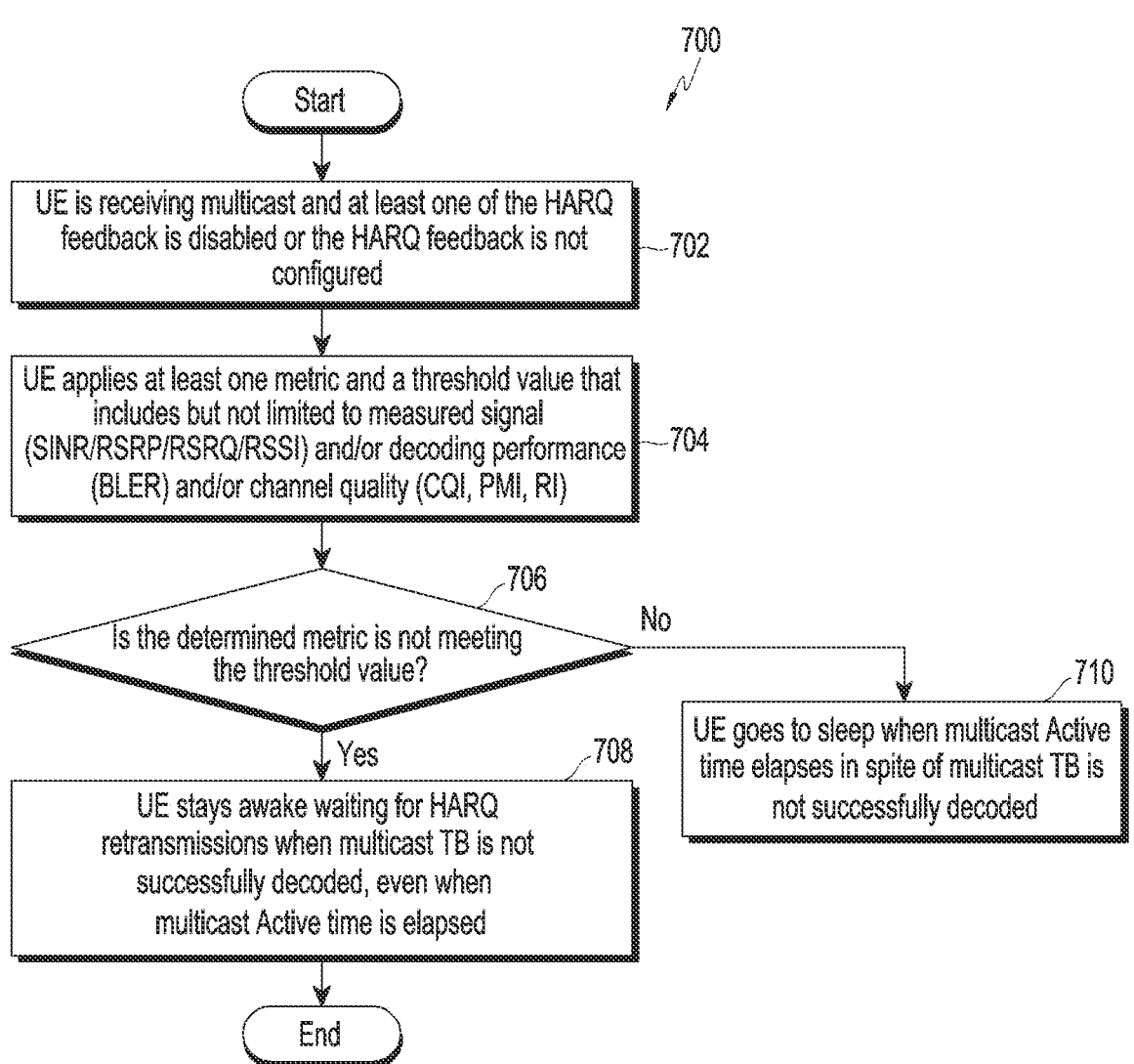
FIG. 7 illustrates an example flow chart of a method for receiving HARQ retransmission(s) while handling the DRX operation, according to an embodiment of the disclosure.

In still another embodiment (as depicted in FIG. 7), the UE (200) stays awake waiting for the HARQ retransmissions, when at least one of the HARQ feedback is disabled or the HARQ feedback is not configured and the multicast transport block decoding is not successful, based on the received signal strength or received signal quality (e.g., Signal to Inference and Noise Ratio (SINR)/Reference Signal Received Power (RSRP)/Reference Signal Received quality (RSRQ)/Received Signal Strength Indicator (RSSI)) or the measured DL block error rate (BLER) or the channel quality (e.g. Channel quality indicator (CQI), Pre-coding Matric Index (PMI), Rank Indicator (RI)). In an example, if the measured SINR/RSRP/RSRQ/RSSI values or the measured DL block error rate (BLER) or other metric are determined as below certain thresholds, the UE (200) does not go to the sleep mode and monitors PDCCH for HARQ Retransmission(s) for the case when at least one of the HARQ feedback is disabled or the HARQ feedback is not configured and the multicast transport block decoding is not successful. The UE (200) implementation, for example, defines at least one of the metric(s) and the associated threshold(s) and accordingly, determines the UE behavior for HARQ retransmission(s) reception.

In one embodiment, the UE (200) stays awake waiting for HARQ retransmissions when at least one of the HARQ feedback is disabled or the HARQ feedback is not configured and the multicast transport block decoding is not successful, based on a battery level of the UE (200). For example, if battery level is above a certain threshold, the UE (200) doesn't go to the sleep mode and monitors PDCCH for HARQ Retransmission(s) for the case when at least one of the HARQ feedback is disabled or the HARQ feedback is not configured, and the multicast transport block decoding is not successful.

In another embodiment, an application layer (or operating system or telephony framework) or the (MBS) service layer informs the UE (radio) protocol stack on whether to stay awake waiting for the HARQ retransmissions when at least one of the HARQ feedback is disabled or the HARQ feedback is not configured and the multicast transport block decoding is not successful or the UE (200) may directly go to the sleep mode, and/or provides the targeted error rate or signal strength/quality or quality of service (QoS) (e.g. packet loss rate, packet delay budget)/quality of experience (QoE) (e.g. application level Mean Opinion Score (MoS) or SINR values for the video quality assessment, jitter, latency, buffering, play-out delay etc.) inputs or other factors governing or guiding whether the UE (200) needs to stay awake for HARQ retransmission. The application layer (or operating system or telephony framework) may communicate to the UE (200) through ATtention (AT) commands. Further, the afore-mentioned feature or solution for staying awake for HARQ retransmissions may be applied statically or semi-statically or dynamically based on the input from the application layer or the service layer.

Measurement/CSI based HARQ feedback enabling/disabling: In another embodiment, the network entity (300) considers at least one of the UE (200) measurements reporting (e.g., SINR, RSRP, RSRQ, RSSI), measured block error rate (BLER), Channel State Information (CSI) feedback (e.g., CQI, PMI, RI), Sounding Reference Signal (SRS) transmission, service QoS constraints, QoE reporting and location information, and accordingly, configures/de-configures or enables/disables the HARQ feedback.

In yet another embodiment, the afore-mentioned channel measurements and/or CSI feedback may be referred, derived, estimated, and predicted based on the unicast measurement reporting and/or CSI feedback/SRS transmission. The network entity (300) may define threshold value(s) for at least one of the afore-mentioned factors or parameters in order to determine whether to configure/de-configure or enable/disable HARQ feedback.

PTM to PTP delivery mode switch: In one embodiment, the network entity (300) switches the UE (200) between the PTM delivery mode and the PTP delivery mode based on reliability need or HARQ feedback configuration. If the HARQ feedback is disabled or not configured for the G-RNTI (i.e. for all UEs receiving this G-RNTI), and certain UEs may need more reliability, the network entity (300) switches the UEs from the PTM delivery mode to the PTP delivery mode.

Figure 8:
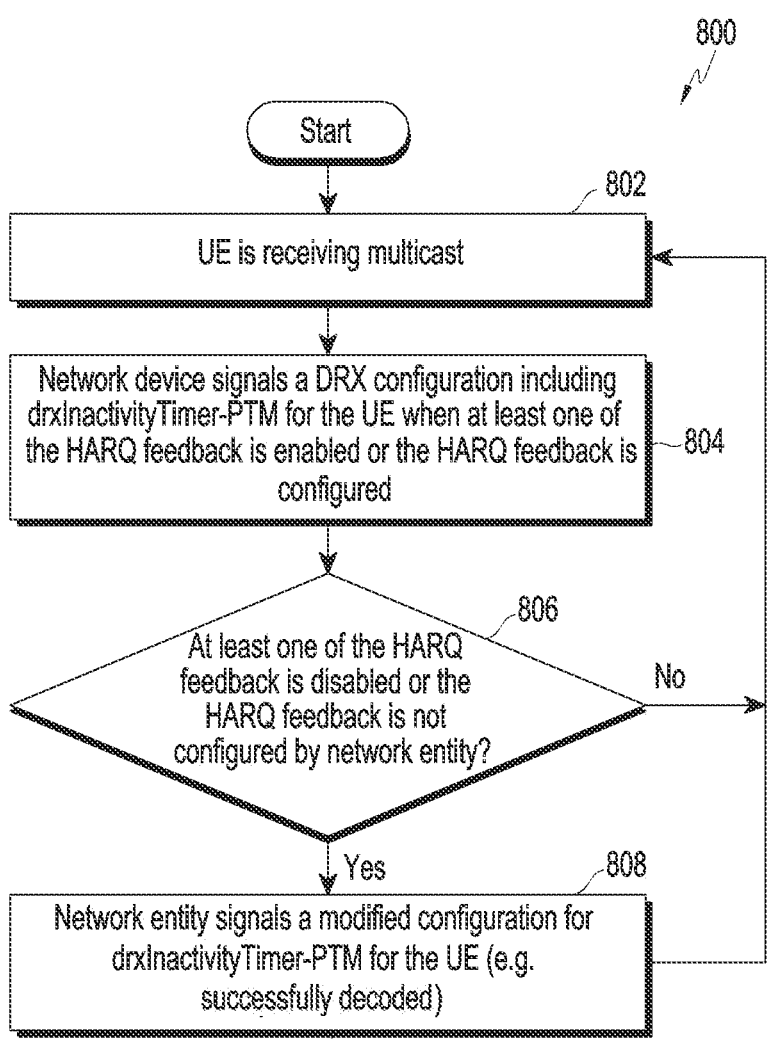
FIG. 8 illustrates an example flow chart of a method, implemented by a network entity, for network providing modified configuration for receiving HARQ retransmission (s) while handling the DRX operation, according to an embodiment of the disclosure.

Configuration of drx-InactivityTimer-PTM: In another embodiment, the network entity (300) modifies the configuration for the UE (200) (e.g., increases drx-InactivityTimer-PTM timer duration) for the UE (200) for which at least one of the HARQ feedback is disabled or the HARQ feedback is not configured. This is depicted in FIG. 8.

In still another embodiment, when the UE (200) is not configured with and/or having HARQ disabled, and is running the local timer Txxx to receive a retransmission for a failed decoding of a multicast TB, if the UE (200) receives a PTP retransmission for that TB, the local timer for PTM retransmission is stopped. This helps in reducing power wasted in monitoring for PTP retransmission and also avoid duplicate reception in case of network retransmitting over the PTP and the PTM.

In yet another embodiment, the UE (200) with at least one of the HARQ feedback disabled or the HARQ feedback not configured, may not monitor or receive PTP retransmission. The PTP retransmission may be UE specific and may be tightly coupled with HARQ feedback provided by the specific UE.

The UE (200) may overrule the NDI rule when UE (200) receives the PTP retransmission for the PTM for which at least one of the HARQ feedback is disabled or is not configured; i.e., consider NDI to be a new transmission regardless of the NDI value when it is addressed to the C-RNTI and received on the HARQ process previously addressed by G-RNTI/G-CS-RNTI.

In one embodiment, the UE behavior described herein, when at least one of the HARQ feedback is disabled or the HARQ feedback not configured is directly applicable for the UE (200) receiving multicast in RRC_INACTIVE state. This is because the UE (200) is receiving the same PTM transmission as received by other UEs in the RRC_CONNECTED state. The UE (200) which is in RRC_INACTIVE state can potentially receive blind retransmission(s) and/or retransmission(s) for other UEs in RRC_CONNECTED state.

In another embodiment, when the UE (200) is transitioned from RRC_CONNECTED state to RRC_INACTIVE state and is receiving multicast service, at least one of the HARQ feedback is disabled or the HARQ feedback is not configured. When the UE (200) is transitioned from RRC_INACTIVE state to RRC_CONNECTED state and is receiving multicast service, at least one of the HARQ feedback is enabled or the HARQ feedback is configured.

In still another embodiment, the network entity (300) may configure the UE (200) for waiting for MBS HARQ retransmissions based on the input from at least one of the plurality of network entities (not shown). The plurality of network entities (not shown) includes Network Exposure Function (NEF) entity, an AMF entity, an UPF entity, a MBSF entity, a gNB and a MB-SMF entity. The network entity (300), for example, indicates to the gNB whether the HARQ retransmissions are needed for all the UEs or for a sub-set of UEs or individual UEs based on the experienced packet error rate and the expected service quality. The gNB may configure the UEs for sending HARQ feedback based on a threshold of Signal to Interference noise Ratio (SINR)/Reference signal Received Power (RSRP)/Received Signal Received Quality (RSRQ)/Received Signal Strength Indicator (RSSI)/Channel State Indication (CSI)/Channel Quality Indication (CQI)/Block Error Rate (BLER) etc. and the type of service using MBS and the availability of uplink resources like Physical uplink control channel (PUCCH).

Figure 3:
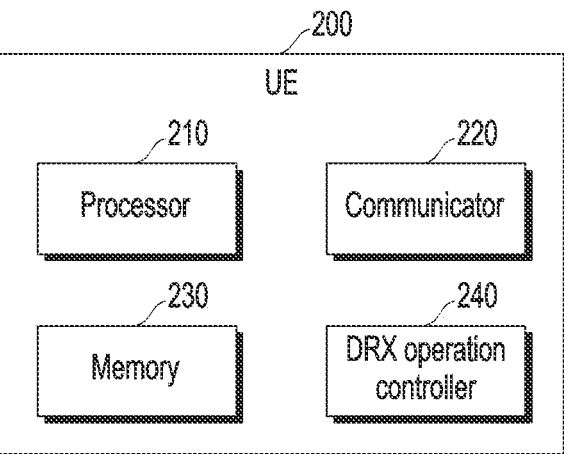
FIG. 3 shows various hardware components of the UE, according to an embodiment of the disclosure.

FIG. 3 shows various hardware components of a UE (200), according to an embodiment of the disclosure. Referring to FIG. 3, in an embodiment, the UE (200) includes a processor (210), a communicator (220), a memory (230) and a DRX operation controller (240). The processor (210) is coupled with the communicator (220), the memory (230) and the DRX operation controller (240).

In an embodiment, the DRX operation controller (240) detects the event. The event may be, for example, the HARQ feedback being disabled, the HARQ feedback not being configured, and the unsuccessful multicast TB decoding. Based on the detected event, the DRX operation controller (240) performs one or more action(s).

In one embodiment, the one or more action(s) includes configuring and running the at least one local timer to track at least one of the HARQ RTT and the HARQ Retransmission (ReTx) and staying awake by the UE (200) while the at least one local timer is running. The at least one local timer, for example, is configured per DL HARQ process associated to a multicast service. The value of the at least one local timer is at least one of at least one of a configured value for a RTT timer and a configured value for a ReTx timer before the HARQ feedback is disabled, a timer value received during a RRC configuration, a one or more HARQ retransmissions duration time, and a maximum value defined for the RTT time or a maximum value defined for the ReTx time.

In another embodiment, the one or more action(s) includes adding the additional timing duration to at least one preconfigured DRX timer value and staying awake by the UE (200) while the at least one preconfigured timer is running.

In yet another embodiment, the one or more action(s) includes staying awake by the UE (200) in spite of the multicast DRX active time being over and continuing to monitor for potential HARQ retransmission. The one or more action(s) includes moving the UE (200) to the sleep mode after clearing the HARQ buffer in which the UE (200) expects the next transmission to be a new transmission and considering New NDI bit as toggled regardless of an actual value of NDI bit.

In still another embodiment, the one or more action(s) includes staying awake and waiting for the HARQ retransmissions upon determining the battery level of the UE (200) meets a predefined threshold battery level. The one or more action(s) includes performing one of staying awake or moving the UE (200) to the sleep mode based on the service information provided by the application layer associated with the UE (200) or the service layer associated with the UE (200).

In an embodiment, the DRX operation controller (240) detects the event, where the event may be, for example, the HARQ feedback being disabled and the HARQ feedback not being configured. Further, the DRX operation controller (240) determines the multicast TB decoding is not successful. In an embodiment, the DRX operation controller (240) starts the local timer associated with the HARQ process and continue monitoring the PDCCH for at least one retransmission upon determining that the multicast TB decoding was not successful. Alternately, the DRX operation controller (240) stops the local timer associated with the HARQ process upon determining that the local timer is running, and the multicast TB decoding is successful.

In another embodiment, the DRX operation controller (240) determines whether the DL data is received with same NDI as compared to previous transmission in the HARQ process in response to continue monitoring the PDCCH for the retransmission. In yet another embodiment, the DRX operation controller (240) stops the local timer associated with the HARQ process upon determining that the DL data has been received with different NDI as compared to the previous transmission in the HARQ process. In still another embodiment, the DRX operation controller (240) determines whether the multicast TB decoding is successful upon determining that the DL data has been received with same NDI as compared to a previous transmission in the HARQ process and stops the local timer when the multicast TB decoding is determined to be successful or continuing the local timer when the multicast TB decoding is determined to be not successful. The DRX operation controller (240) determines whether the local timer has expired upon determining that the DL data has not been received and moving the UE (200) to a sleep mode when the local timer is determined to be expired.

In an embodiment of the disclosure, the DRX operation controller (240) detects the event, where the event may be, for example, the HARQ feedback being disabled and the HARQ feedback not being configured. Further, the DRX operation controller (240) identifies the at least one metric value and the threshold value that is identified based on at least one of the measured signal information, the decoding performance information, and the channel quality information, wherein at least one the metric and the threshold value can be at least one of predefined, configured or implementation determined. In an embodiment, the DRX operation controller (240) determines the at least one metric value meets the threshold value. In another embodiment, the DRX operation controller (240) stays awake waiting for the HARQ retransmission when multicast TB is not successfully decoded, even when multicast DRX Active Time is elapsed upon determining that the at least one metric value meets the threshold value. In an embodiment, the DRX operation controller (240) moves to a sleep mode when multicast active time elapses in spite of a multicast TB is not successfully decoded upon determining that the at least one metric value does not meet the threshold value.

The DRX operation controller (240), for example, is implemented by analog and/or digital circuits such as logic gates, integrated circuits, microprocessors, microcontrollers, memory circuits, passive electronic components, active electronic components, optical components, hardwired circuits and the like, and may optionally be driven by firmware. The DRX operation controller (240) and the processor (210) may be integrally referred to as at least one processor.

The processor (210) is configured to execute instructions stored in the memory (230) and to perform various processes. The communicator (220) is configured for communicating internally between internal hardware components and with external devices via one or more networks. The memory (230) is also configured to store instructions to be executed by the processor (210). The memory (230) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. Additionally, the memory (230) may, in some examples, be considered a non-transitory storage medium. The term "non-transitory" may indicate that the storage medium is not embodied in a carrier wave or a propagated signal. However, the term "non-transitory" should not be interpreted that the memory (230) is non-movable. In certain examples, a non-transitory storage medium may store data that can, over time, change (e.g., in Random Access Memory (RAM) or cache).

Although FIG. 3 shows various hardware components of a UE (200) but it is to be understood that other embodiments are not limited thereon. In other embodiments, the UE (200) may include less or more number of components. Further, the labels or names of the components are used only for illustrative purpose and does not limit the scope of the disclosure. One or more components may be combined together to perform same or substantially similar function in the UE (200).

Figure 4:
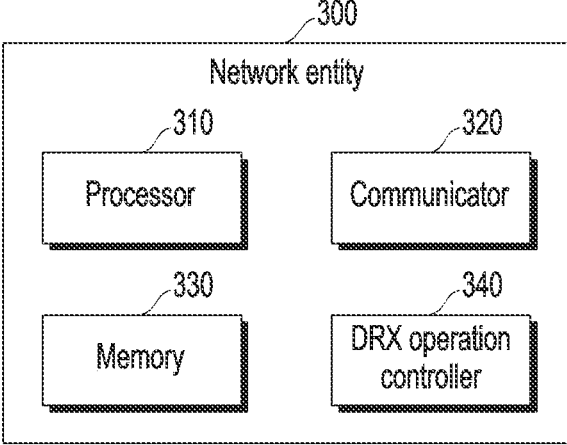
FIG. 4 shows various hardware components of a network entity, according to an embodiment of the disclosure.

FIG. 4 shows various hardware components of the network entity (300), according to an embodiment of the disclosure. The network entity (300) may be, for example, the gNB and a NR base station. Referring to FIG. 4, in an embodiment, the network entity (300) includes a processor (310), a communicator (320), a memory (330) and a DRX operation controller (340). The processor (310) is coupled with the communicator (320), the memory (330) and the DRX operation controller (340).

In an embodiment, the DRX operation controller (340) detects the event, where the event may be, for example, the HARQ feedback being disabled, the HARQ feedback not being configured, and the multicast TB decoding not being successful. Detecting the event is based on a parameter, where the parameter can be, for example, the measurement reporting information, the measured block error rate information, the CSI feedback information, the SRS transmission information, the service QoS constraint information, and the QoE reporting and location information. On detecting the event, the DRX operation controller (340) sends the message to the UE (200). The message includes the modified configuration associated with the DRX timer.

In one embodiment, the DRX operation controller (340) receives the message from the network device (not shown) based on the input received from the network device. The input, for example, includes at least one of the experienced packet error rate and the expected service quality. The network device can be, for example, at least one of the NEF entity, the AMF entity, the UPF entity, the MBSFN, the gNB and the MB-SMF entity. The message indicates whether the MBS HARQ retransmission is needed for all the UEs or for the sub-set of the UEs or the individual UE. Based on the received message, the DRX operation controller (340) handles the DRX operation. Handling the DRX operation includes at least one of: configuring the UE (200) for a waiting time for the MBS HARQ retransmission or configuring the UE (200) for sending a HARQ feedback.

In another embodiment, the DRX operation controller (340) is physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The DRX operation controller (340) and the processor (310) may be integrally referred to as at least one processor.

The processor (310) is configured to execute instructions stored in the memory (330) and to perform various processes. The communicator (320) is configured for communicating internally between internal hardware components and with external devices via one or more networks. The memory (330) is also configured to store instructions to be executed by the processor (310). The memory (330) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (330) may, in some examples, be considered a non-transitory storage medium. The term "non-transitory" may indicate that the storage medium is not embodied in a carrier wave or a propagated signal. However, the term "non-transitory" should not be interpreted that the memory (330) is non-movable. In certain examples, a non-transitory storage medium may store data that can, over time, change (e.g., in Random Access Memory (RAM) or cache).

Although the FIG. 4 shows various hardware components of a network entity (300) but it is to be understood that other embodiments are not limited thereon. In other embodiments, the network entity (300) may include less or more number of components. Further, the labels or names of the components are used only for illustrative purpose and does not limit the scope of the disclosure. One or more components may be combined together to perform same or substantially similar function in the network entity (300).

FIG. 5 illustrates an example flow chart (500) of a method for defining the local timer Txxx while handling the DRX operation, according to an embodiment of the disclosure. The operations 502-512 are handled by the DRX operation controller (240).

Referring to FIG. 5, at operation 502, a UE (200) is receiving the multicast and the PDSCH decode fails. At operation 504, the method includes determining whether the HARQ feedback is configured and enabled (i.e. harq-FeedbackEnablerMulticast set to enabled or harqFeedbackEnablerMulticast is set to dci-enabler and HARQ feedback is indicated as enabled by the DCI (e.g. the DCI 4_2 can include a field to indicate whether HARQ feedback is enabled or disabled. While DCI 4_1 when scheduled implies that HARQ feedback is enabled)). In response determining that the HARQ feedback is not configured and not enabled then, at operation 506, the method includes determining whether RTT and ReTx timer configuration are available or were available earlier to the HARQ feedback disabling or deconfiguration. In response determining that the HARQ feedback is configured and enabled then, at operation 508, the method follows the normal procedure defined in the 3GPP specification (Refer FIG. 1).

In response to determining that RTT and ReTx timer configuration are available or were available earlier to the HARQ feedback disabling or deconfiguration then, at operation 510, a UE (200) determines Txxx as: (option 1: Txxx=configured RTT timer value or configured ReTx timer value, option 2: Txxx=Max HARQ ReTX*configured ReTx timer value, and option 3: any combination of configured RTT timer value and/or configured ReTX timer value). In response to determining that RTT and ReTx timer configuration are not available or were not available earlier to the HARQ feedback disabling or deconfiguration then, at operation 512, the UE (200) determines the Txxx as the maximum value defined for RTT time or ReTx time.

FIG. 6 illustrates an example flow chart (600) of a method for operating the local timer Txxx while handling the DRX operation, according to an embodiment of the disclosure. The operations 602-618 are handled by the DRX operation controller (240).

Referring to FIG. 6, at operation 602, the UE (200) is receiving the multicast. At operation 604, the method includes determining whether the HARQ feedback is configured and enabled (i.e. harq-FeedbackEnablerMulticast is set to enabled or harqFeedbackEnablerMulticast is set to dci-enabler and HARQ feedback is indicated as enabled by the DCI (e.g. the DCI 4_2 can include a field to indicate whether HARQ feedback is enabled or disabled. While DCI 4_1 when scheduled implies that HARQ feedback is enabled)). Upon determining that the HARQ feedback is configured and enabled then, at operation 606, the method follows the normal procedure as defined in the 3GPP specification (Refer FIG. 1). Upon determining that the HARQ feedback is not configured and enabled then, at operation 608, the method includes determining whether the decoding of multicast TB fails. Upon determining that the decoding of multicast TB does not fails then, at operation 610, the method includes stopping the local timer Txxx associated with the HARQ process if the local timer Txxx is running. Upon determining that the decoding of multicast TB fails then, at operation 612, the method includes starting the local timer Txxx associated with the HARQ process. At operation 614, the method includes continue monitoring the PDCCH for retransmission(s).

At operation 616, the method includes determining whether the DL data is received with same NDI as compared to previous transmission in same HARQ process. Upon determining that the DL data is not received with same NDI as compared to previous transmission in same HARQ process then at operation 618, the method includes stopping the local timer Txxx associated with the HARQ process if the local timer (Txxx) is running.

FIG. 7 illustrates an example flow chart (700) of a method for receiving HARQ retransmission(s) while handling the DRX operation, according to an embodiment of the disclosure.

Referring to FIG. 7, at operation 702, a UE (200) is receiving the multicast and at least one of the HARQ feedback is disabled or the HARQ feedback is not configured. At operation 704, the UE (200) applies at least one metric and the threshold value that includes but not limited to measured signal (e.g., SINR/RSRP/RSRQ/RSSI) and/or decoding performance (e.g., BLER) and/or channel quality (e.g., CSI, CQI, PMI, RI).

At operation 706, the UE (200) determines whether the determined metric is not meeting the threshold value. In response to determining that the determined metric is not meeting the threshold value then, at operation 708, the UE (200) stays awake waiting for the HARQ retransmissions when multicast TB is not successfully decoded, even when multicast Active time is elapse. In response to determining that the determined metric is meeting the threshold value then, at operation 710, the UE (200) goes to the sleep mode when the multicast active time elapses in spite of multicast TB is not successfully decoded.

FIG. 8 illustrates an example flow chart (800) of a method, implemented by the network entity (300) while handling the DRX operation, for providing modified configuration for receiving HARQ retransmission(s), according to an embodiment of the disclosure.

Referring to FIG. 8, at operation 802 (predefined operation), a UE (200) is receiving the multicast. At operation 804, a network entity (300) signals the DRX configuration including drxInactivityTimer-PTM for the UE (200) when at least one of the HARQ feedback is enabled or the HARQ feedback is configured. At operation 806, the method includes determining that at least one of the HARQ feedback is disabled or the HARQ feedback is not configured by the network entity (300). Upon determining that at least one of the HARQ feedback is disabled or the HARQ feedback is not configured by the network entity (300) then, at operation 808, the network entity (300) signals the modified configuration for drxInactivityTimer-PTM for the UE (200) (i.e., drxInactivityTimer-PTM is increased for the UE (200). Upon determining that at least one of the HARQ feedback is not disabled or the HARQ feedback is configured by the network entity (300) then the operation moves to operation 802.

Figure 9:
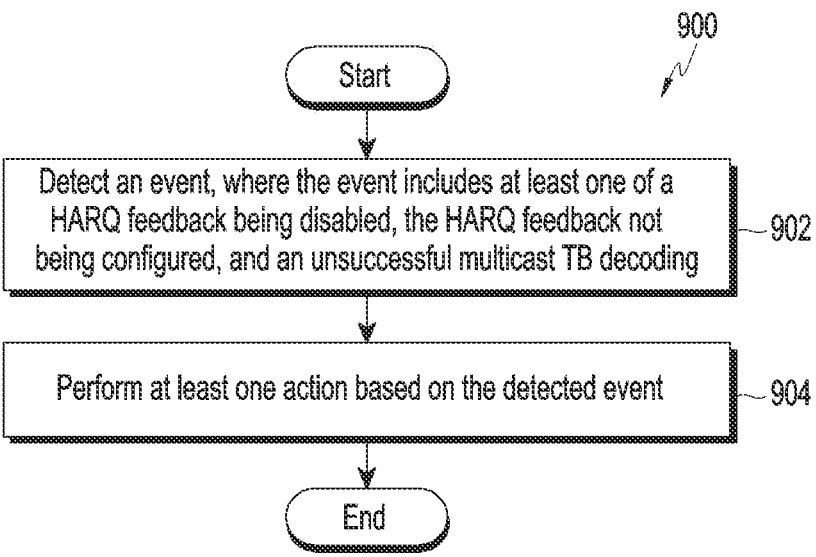
FIG. 9 is a flow chart illustrating a method for handling the DRX operation in the wireless network, according to an embodiment of the disclosure.

FIG. 9 is a flow chart (900) illustrating a method for handling the DRX operation in the wireless network (400), according to an embodiment of the disclosure. The operations 902 and 904 are handled by the DRX operation controller (240).

Referring to FIG. 9, at operation 902, the method includes detecting the event. The event includes at least one of the HARQ feedback being disabled, the HARQ feedback not being configured, and the unsuccessful multicast TB decoding. At operation 904, the method includes performing the at least one action based on the detected event. In an embodiment, the at least one action includes configuring and running at least one local timer to track at least one of a HARQ RTT and a HARQ Retransmission (ReTx) and staying awake by a UE (200) while the at least one local timer is running.

In one embodiment, the at least one action includes adding an additional timing duration to at least one preconfigured DRX timer value and staying awake by the UE (200) while the at least one preconfigured timer is running. In another embodiment, the at least one action includes staying awake by the UE (200) in spite of a multicast DRX active time being over and continuing to monitor for potential HARQ retransmission.

In yet another embodiment, the at least one action includes moving the UE (200) to a sleep mode after clearing a HARQ buffer in which the UE (200) expects a next transmission to be a new transmission and considering New Data Indictor (NDI) bit as toggled regardless of an actual value of NDI bit. In still another embodiment, the at least one action includes staying awake and waiting for the HARQ retransmissions upon determining a battery level of the UE (200) meets a predefined threshold battery level. In an embodiment, the at least one action includes performing one of staying awake or moving the UE (200) to a sleep mode based on a service information provided by an application layer associated with the UE (200) or a service layer associated with the UE (200).

In an embodiment, the MBS service considered for the described embodiments of the disclosure pertains to at least one of the MBS multicast service which is dynamically scheduled over the PDCCH and addressed to the G-RNTI or the G-CS-RNTI, the MBS multicast service which is semi-persistently scheduled and the MBS multicast service which is provided through configured downlink multicast assignment. In another embodiment, the multicast service may be the one which is being received in at least one of the RRC_CONNECTED state and the RRC_INACTIVE state.

The various actions, acts, blocks, operations, or the like in the flow charts (500-900) may be performed in the order presented, in a different order or simultaneously. Further, in some embodiments, some of the actions, acts, blocks, operations, or the like may be omitted, added, modified, skipped, or the like without departing from the scope of the disclosure.

The embodiments disclosed herein can be implemented through at least one software program running on at least one hardware device and performing network management functions to control the elements. The elements can be at least one of a hardware device, or a combination of hardware device and software module. The elements can also include inter-module, inter-layer and inter-processor communication, interactions across application entities and communication entities, user defined features and functions and memory, storage and database management.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for handling a discontinuous reception (DRX) operation by a user equipment (UE) in a wireless network, the method comprising:

determining, by the UE, that decoding of a multicast transport block (TB) has been unsuccessful;

detecting, by the UE, an event comprising at least one of a hybrid automatic repeat request (HARQ) feedback being disabled or a HARQ feedback not being configured; and performing, by the UE, at least one action based on the detected event, wherein the at least one action comprises adding an additional timing duration to a preconfigured value of a DRX timer, and staying awake while the DRX timer with a value of sum of the additional timing duration and the preconfigured value is running.

2. The method of claim 1, wherein the at least one action further comprises at least one of:

configuring and running at least one local timer to track at least one of a HARQ round trip time (RTT) or a HARQ retransmission (ReTx) and staying awake while the at least one local timer is running;

staying awake in spite of a multicast DRX active time being over and continuing to monitor for potential HARQ retransmissions;

moving the UE to a sleep mode after clearing a HARQ buffer in which the UE expects a next transmission to be a new transmission and considering new data indictor (NDI) bit as toggled regardless of an actual value of NDI bit;

staying awake and waiting for the potential HARQ retransmissions upon determining that a battery level of the UE meets a predefined threshold battery level; or performing one of staying awake or moving the UE to a sleep mode based on a service information provided by an application layer associated with the UE or a service layer associated with the UE.

3. The method of claim 2, wherein the at least one local timer is configured per downlink (DL) HARQ process associated to a multicast service.

4. The method of claim 2, wherein a value of the at least one local timer is at least one of:

at least one of a configured value for a RTT timer or a configured value for a ReTx timer before a HARQ feedback is disabled, a timer value received during a radio resource control (RRC) configuration, a one or more HARQ retransmissions duration time, or a maximum value defined for a RTT time or a maximum value defined for a ReTx time.

5. The method of claim 1, wherein the DRX operation is handled, when the UE receives a new radio multicast broadcast service (NR MBS).

6. The method of claim 1, further comprising performing at least one of:

starting a local timer associated with a HARQ process and continue monitoring a physical downlink control channel (PDCCH) for at least one retransmission upon determining that the multicast TB decoding was not successful; or stopping the local timer associated with the HARQ process upon determining that the local timer is running, and the multicast TB decoding is successful.

7. The method of claim 6, further comprising:

determining whether a downlink (DL) data is received with same new data indictor (NDI) as compared to previous transmission in the HARQ process in response to continue monitoring the PDCCH for the at least one retransmission; and performing at least one of:

stopping the local timer associated with the HARQ process upon determining that the DL data has been received with different NDI as compared to a previous transmission in the HARQ process;

determining whether the multicast TB decoding is successful upon determining that the DL data has been received with same NDI as compared to a previous transmission in the HARQ process and stopping the local timer when the multicast TB decoding is determined to be successful or continuing the local timer when the multicast TB decoding is determined to be not successful; or determining whether the local timer has expired upon determining that the DL data has not been received and moving the UE to a sleep mode when the local timer is determined to be expired.

8. The method of claim 1, further comprising:

identifying at least one metric value and a threshold value based on at least one of a measured signal information, a decoding performance information, or a channel quality information;

determining the at least one metric value meets the threshold value; and performing one of:

staying awake waiting for a HARQ retransmission when multicast transport block (TB) is not successfully decoded, even when multicast DRX active time is elapsed upon determining that the at least one metric value meets the threshold value; or moving to a sleep mode when multicast active time elapses in spite of a multicast TB is not successfully decoded upon determining that the at least one metric value does not meet the threshold value.

9. A user equipment (UE) for handling a discontinuous reception (DRX) operation in a wireless network, comprising:

memory storing instructions; and at least one processor coupled to the memory, wherein the instructions, when executed by the at least one processor, cause the UE to:

determine that decoding of a multicast transport block (TB) has been unsuccessful,

detect an event comprising at least one of a hybrid automatic repeat request (HARQ) feedback being disabled or the HARQ feedback not being configured, and perform at least one action based on the detected event, wherein the at least one action comprises adding an additional timing duration to a preconfigured value of a DRX timer, and staying awake while the DRX timer with a value of sum of the additional timing duration and the preconfigured value is running.

10. The UE of claim 9, wherein the at least one action further comprises:

configuring and running at least one local timer to track at least one of a HARQ round trip time (RTT) or a HARQ retransmissions (ReTx) and staying awake while the at least one local timer is running;

staying awake in spite of a multicast DRX active time being over and continuing to monitor for potential HARQ retransmissions;

moving the UE to a sleep mode after clearing a HARQ buffer in which the UE expects a next transmission to be a new transmission and considering new data indictor (NDI) bit as toggled regardless of an actual value of NDI bit;

staying awake waiting for the potential HARQ retransmissions upon determining that a battery level of the UE meets a predefined threshold battery level; or performing to one of staying awake or moving the UE to a sleep mode based on a service information provided by an application layer associated with the UE or a service layer associated with the UE.

11. The UE of claim 10, wherein the at least one local timer is configured per downlink (DL) HARQ process associated to a multicast service.

12. The UE of claim 10, wherein a value of the at least one local timer is at least one of:

at least one of a configured value for a RTT timer or a configured value for a ReTx timer before a HARQ feedback is disabled, a timer value received during a radio resource control (RRC) configuration, a one or more HARQ retransmissions duration time, or a maximum value defined for a RTT time or a maximum value defined for a ReTx time.

13. The UE of claim 9, wherein the DRX operation is handled, when the UE receives a new radio multicast broadcast service (NR MBS).

14. The UE of claim 9, wherein the instructions, when executed by the at least one processor, cause the UE to perform at least one of:

start a local timer associated with a HARQ process and continue to monitor a physical downlink control channel (PDCCH) for at least one retransmission upon determining that the multicast TB decoding was not successful, or stop the local timer associated with the HARQ process upon determining that the local timer is running, and the multicast TB decoding is successful.

15. The UE of claim 14, wherein the instructions, when executed by the at least one processor, cause the UE to:

determine whether a downlink (DL) data received with same new data indictor (NDI) as compared to previous transmission in the HARQ process in response to continue monitoring the PDCCH for the at least one retransmission, and perform at least one of:

stop the local timer associated with the HARQ process upon determining that the DL data has been received with different NDI as compared to a previous transmission in the HARQ process, determine whether the multicast TB decoding is successful upon determining that the DL data has been received with same NDI as compared to a previous transmission in the HARQ process and stopping the local timer when the multicast TB decoding is determined to be successful or continuing the local timer when the multicast TB decoding is determined to be not successful, or determine whether the local timer has expired upon determining that the DL data has not been received and moving the UE to a sleep mode when the local timer is determined to be expired.

16. The UE of claim 9, wherein the instructions, when executed by the at least one processor, cause the UE to:

identify at least one metric value and a threshold value is identified based on at least one of a measured signal information, a decoding performance information, or a channel quality information, wherein at least one metric and a threshold value can be at least one of predefined, configured or implementation determined, determine the at least one metric value meets a threshold value, and perform one of:

stay awake waiting for a HARQ retransmission when multicast transport block (TB) is not successfully decoded, even when multicast DRX active time is elapsed upon determining that the at least one metric value meets the threshold value, or move to a sleep mode when multicast active time elapses in spite of a multicast TB is not successfully decoded upon determining that the at least one metric value does not meet the threshold value.

* * * * *